US012653111B2

(12) United States Patent
Steinhauer et al.

(10) Patent No.: US 12,653,111 B2
(45) Date of Patent: Jun. 16, 2026

(54) PRUNING SHEARS

(71) Applicant: MILWAUKEE ELECTRIC TOOL CORPORATION, Brookfield, WI (US)

(72) Inventors: Alex G. Steinhauer, Mukwonago, WI (US); Griffin M. Steffy, Westfield, IN (US); Joseph R. Outinen, Milwaukee, WI (US); Justin M. Czok, Park Ridge, IL (US); Peter J. Davies, Milwaukee, WI (US); Sara Burch, Milwaukee, WI (US); Scott D. Libert, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 408 days.

(21) Appl. No.: 18/076,111

(22) Filed: Dec. 6, 2022

(65) Prior Publication Data

US 2023/0172113 A1 Jun. 8, 2023

Related U.S. Application Data

(60) Provisional application No. 63/286,904, filed on Dec. 7, 2021.

(51) Int. Cl.
*A01G 3/037* (2006.01)
*A01G 3/033* (2006.01)
*A01G 3/053* (2006.01)

(52) U.S. Cl.
CPC ............. *A01G 3/037* (2013.01); *A01G 3/033* (2013.01); *A01G 3/053* (2013.01)

(58) Field of Classification Search
CPC ........ A01G 3/033; A01G 3/037; A01G 3/053; A01G 3/08; B26B 15/00

USPC .......................................................... 30/228
See application file for complete search history.

(56) References Cited

U.S. PATENT DOCUMENTS

| | | | |
|---|---|---|---|
| 5,002,135 | A | 3/1991 | Pellenc |
| 5,235,261 | A | 8/1993 | Philipp |
| 5,553,675 | A | 9/1996 | Pitzen et al. |
| 5,712,543 | A | 1/1998 | Sjostrom |
| 5,747,953 | A | 5/1998 | Philipp |
| 5,847,908 | A | 12/1998 | Herbstritt |
| 6,451,976 | B1 | 9/2002 | Lu et al. |
| 6,891,457 | B2 | 5/2005 | Sako |
| 6,933,689 | B2 | 8/2005 | Yamamoto |
| 6,973,727 | B2 | 12/2005 | Yao |

(Continued)

FOREIGN PATENT DOCUMENTS

| | | |
|---|---|---|
| CN | 2896850 Y | 5/2007 |
| CN | 201313293 Y | 9/2009 |

(Continued)

OTHER PUBLICATIONS

International Search Report and Written Opinion for Application No. PCT/US2022/052016 dated Apr. 17, 2023 (9 pages).

*Primary Examiner* — Jason Daniel Prone
(74) *Attorney, Agent, or Firm* — Dority & Manning, P.A.

(57) ABSTRACT

Pruning shears include a housing having a motor portion and a handle portion. A motor is disposed within the motor portion of the housing, and a trigger assembly is disposed within the housing portion. The trigger assembly is operable to control the motor. The trigger assembly includes a trigger and a trigger lock. The trigger lock prevents actuation of the trigger until the trigger lock is depressed.

5 Claims, 15 Drawing Sheets

(56) References Cited

U.S. PATENT DOCUMENTS

| | | | |
|---|---|---|---|
| 7,053,567 | B2 | 5/2006 | Yamamoto |
| 7,076,830 | B2 | 7/2006 | Conner et al. |
| 7,090,030 | B2 | 8/2006 | Miller |
| 7,174,972 | B2 | 2/2007 | Kristen et al. |
| 7,210,541 | B2 | 5/2007 | Miller |
| 7,240,869 | B2 | 7/2007 | Sederberg et al. |
| 7,242,390 | B2 | 7/2007 | Bader et al. |
| 7,359,628 | B2 | 4/2008 | Broghammer et al. |
| 7,411,144 | B2 | 8/2008 | Broghammer |
| 7,487,930 | B2 | 2/2009 | Sederberg et al. |
| 7,578,461 | B2 | 8/2009 | Sederberg et al. |
| 7,681,659 | B2 | 3/2010 | Zhang et al. |
| 7,725,223 | B2 | 5/2010 | Gordon et al. |
| 7,868,263 | B2 | 1/2011 | Hammerstingl et al. |
| 7,882,899 | B2 | 2/2011 | Borinato et al. |
| 7,980,320 | B2 | 7/2011 | Inagaki et al. |
| 8,011,441 | B2 | 9/2011 | Leimbach et al. |
| 8,011,547 | B2 | 9/2011 | Leimbach et al. |
| 8,042,717 | B2 | 10/2011 | Lam et al. |
| 8,065,805 | B2 | 11/2011 | Stones et al. |
| 8,069,575 | B2 | 12/2011 | Stones et al. |
| 8,210,273 | B2 | 7/2012 | Suzuki et al. |
| 8,230,941 | B2 | 7/2012 | Leimbach et al. |
| 8,261,642 | B2 | 9/2012 | Brändström et al. |
| 8,267,296 | B2 | 9/2012 | Leimbach et al. |
| 8,267,297 | B2 | 9/2012 | Leimbach et al. |
| 8,276,280 | B2 | 10/2012 | Lee et al. |
| 8,286,722 | B2 | 10/2012 | Leimbach et al. |
| 8,387,718 | B2 | 3/2013 | Leimbach et al. |
| 8,587,230 | B2 | 11/2013 | Pant et al. |
| 8,587,231 | B2 | 11/2013 | Pant |
| 8,602,282 | B2 | 12/2013 | Leimbach et al. |
| 8,616,300 | B2 | 12/2013 | Suzuki et al. |
| 8,636,079 | B2 | 1/2014 | Totsu |
| 8,656,597 | B2 * | 2/2014 | Pellenc ................. A01G 3/037 |
| | | | 30/228 |
| 8,657,032 | B2 | 2/2014 | Numata |
| 8,657,174 | B2 | 2/2014 | Yates et al. |
| 8,689,901 | B2 | 4/2014 | Chen |
| 8,763,874 | B2 | 7/2014 | McCardle et al. |
| 8,808,319 | B2 | 8/2014 | Houser et al. |
| 8,810,085 | B2 | 8/2014 | Matsunaga et al. |
| 8,813,370 | B2 | 8/2014 | Pellenc |
| 8,833,221 | B2 | 9/2014 | Tomita et al. |
| 8,833,234 | B2 | 9/2014 | Gronau et al. |
| 8,856,555 | B2 | 10/2014 | Heydron et al. |
| 8,875,804 | B2 | 11/2014 | Puzio et al. |
| 8,974,932 | B2 | 3/2015 | McGahan et al. |
| 8,988,015 | B2 | 3/2015 | Forster et al. |
| 8,995,907 | B2 | 3/2015 | Joseph |
| 9,415,488 | B2 | 8/2016 | Puzio et al. |
| 9,450,471 | B2 | 9/2016 | Mergener et al. |
| 9,563,219 | B2 | 2/2017 | Heydron et al. |
| 9,654,050 | B2 | 5/2017 | Kokinelis et al. |
| 9,676,088 | B2 | 6/2017 | Leimbach et al. |
| 9,717,185 | B2 | 8/2017 | Stones et al. |
| 9,774,229 | B1 | 9/2017 | Mergener et al. |
| 9,954,417 | B2 | 4/2018 | Mergener et al. |
| 9,960,656 | B2 | 5/2018 | Mergener et al. |
| 10,099,392 | B2 * | 10/2018 | Suda ..................... A01G 3/037 |
| 10,263,464 | B2 * | 4/2019 | Pellenc ................. A01G 3/037 |
| 10,293,447 | B2 * | 5/2019 | Pellenc ................. A01G 3/037 |
| 10,469,018 | B2 * | 11/2019 | Erickson ............... A01G 3/037 |
| 11,684,017 | B2 * | 6/2023 | Nii ........................ A01G 3/037 |
| | | | 83/13 |
| 2002/0087179 | A1 | 7/2002 | Culp et al. |
| 2004/0206519 | A1 | 10/2004 | Kristen et al. |
| 2005/0011075 | A1 | 1/2005 | Stones et al. |
| 2005/0015992 | A1 | 1/2005 | Stones et al. |
| 2005/0015993 | A1 | 1/2005 | Stones et al. |
| 2005/0015994 | A1 | 1/2005 | Stones et al. |
| 2005/0022388 | A1 | 2/2005 | Stones et al. |
| 2005/0022389 | A1 | 2/2005 | Stones et al. |
| 2005/0028374 | A1 | 2/2005 | Stones et al. |
| 2005/0028377 | A1 | 2/2005 | Stones et al. |

| | | | |
|---|---|---|---|
| 2005/0028378 | A1 | 2/2005 | Stones et al. |
| 2005/0028379 | A1 | 2/2005 | Stones et al. |
| 2006/0228994 | A1 | 10/2006 | Syverson |
| 2007/0114049 | A1 | 5/2007 | Steverding et al. |
| 2007/0144753 | A1 | 6/2007 | Miller |
| 2007/0296286 | A1 | 12/2007 | Avenell |
| 2008/0053805 | A1 | 3/2008 | Wanek |
| 2009/0308628 | A1 | 12/2009 | Totsu |
| 2010/0021249 | A1 | 1/2010 | Beichter |
| 2010/0269355 | A1 * | 10/2010 | Yang ..................... A01G 3/037 |
| | | | 30/228 |
| 2010/0307782 | A1 | 12/2010 | Iwata et al. |
| 2011/0185579 | A1 | 8/2011 | Pellenc |
| 2011/0284255 | A1 | 11/2011 | Ookubo et al. |
| 2011/0291777 | A1 | 12/2011 | Stiltz et al. |
| 2012/0011729 | A1 | 1/2012 | Kim et al. |
| 2012/0246942 | A1 * | 10/2012 | Nie ........................ A01G 3/037 |
| | | | 30/247 |
| 2012/0312573 | A1 | 12/2012 | Yanagihara |
| 2013/0055575 | A1 * | 3/2013 | Delmas ................. A01G 3/037 |
| | | | 30/228 |
| 2014/0008090 | A1 | 1/2014 | Kokinelis et al. |
| 2014/0100687 | A1 | 4/2014 | Ekstrom et al. |
| 2014/0283392 | A1 | 9/2014 | Mezher |
| 2015/0097641 | A1 | 4/2015 | Chen |
| 2016/0219793 | A1 | 8/2016 | Xianpeng |
| 2016/0221085 | A1 | 8/2016 | Zhong et al. |
| 2017/0165824 | A1 | 6/2017 | Takeda |
| 2017/0266796 | A1 | 9/2017 | Leimbach et al. |
| 2017/0271949 | A1 | 9/2017 | Mergener et al. |
| 2018/0215029 | A1 | 8/2018 | Steckel |
| 2018/0248446 | A1 | 8/2018 | Mergener et al. |
| 2023/0137643 | A1 * | 5/2023 | Gautier ................. A01G 3/037 |
| | | | 30/249 |
| 2023/0263102 | A1 * | 8/2023 | Toudou ................. A01G 3/037 |
| | | | 30/228 |
| 2024/0188503 | A1 * | 6/2024 | Kato ..................... A01G 3/037 |
| 2024/0407303 | A1 * | 12/2024 | Czubek ................. A01G 3/037 |

FOREIGN PATENT DOCUMENTS

| | | |
|---|---|---|
| CN | 201319766 Y | 10/2009 |
| CN | 101574810 A | 11/2009 |
| CN | 101577520 A | 11/2009 |
| CN | 201471459 U | 5/2010 |
| CN | 201591038 U | 9/2010 |
| CN | 202026623 U | 11/2011 |
| CN | 102792858 A | 11/2012 |
| CN | 102217494 B | 1/2013 |
| CN | 103283507 A | 9/2013 |
| CN | 203537937 U | 4/2014 |
| CN | 102907268 B | 1/2016 |
| CN | 205685278 U | 11/2016 |
| CN | 205755770 U | 12/2016 |
| CN | 106997821 A | 8/2017 |
| CN | 105880685 B | 4/2018 |
| CN | 207201405 U | 4/2018 |
| CN | 207911440 U | 9/2018 |
| CN | 208029561 U | 11/2018 |
| CN | 208242301 U | 12/2018 |
| CN | 109197211 A | 1/2019 |
| CN | 109197212 A | 1/2019 |
| CN | 208490304 U | 2/2019 |
| CN | 208924728 U | 6/2019 |
| CN | 110149938 A | 8/2019 |
| CN | 110161920 A | 8/2019 |
| CN | 209473090 U | 10/2019 |
| CN | 110419350 A | 11/2019 |
| CN | 209660015 U | 11/2019 |
| CN | 110521418 A | 12/2019 |
| CN | 209806518 U | 12/2019 |
| CN | 209949936 U | 1/2020 |
| CN | 209983135 U | 1/2020 |
| CN | 210017052 U | 2/2020 |
| CN | 210113819 U | 2/2020 |
| CN | 210183971 U | 3/2020 |
| CN | 210202552 U | 3/2020 |
| CN | 210444957 U | 5/2020 |

(56) References Cited

FOREIGN PATENT DOCUMENTS

| | | | |
|---|---|---|---|
| CN | 111279908 A | 6/2020 |
| CN | 210868881 U | 6/2020 |
| CN | 210900478 U | 7/2020 |
| CN | 211064241 U | 7/2020 |
| CN | 211064242 U | 7/2020 |
| CN | 211185052 U | 8/2020 |
| CN | 109197214 B | 9/2020 |
| CN | 211558085 U | 9/2020 |
| CN | 211793090 U | 10/2020 |
| CN | 109197213 B | 11/2020 |
| CN | 111903363 A | 11/2020 |
| CN | 211881178 U | 11/2020 |
| CN | 108668669 B | 12/2020 |
| CN | 112088675 A | 12/2020 |
| CN | 212034955 U | 12/2020 |
| CN | 212259865 U | 1/2021 |
| CN | 112314214 A | 2/2021 |
| CN | 212517831 U | 2/2021 |
| DE | 8814543 U1 | 1/1989 |
| DE | 10033362 A1 | 1/2002 |
| DE | 10204949 A1 | 9/2003 |
| DE | 202004001665 U1 | 6/2004 |
| DE | 102007001061 A1 | 7/2008 |
| DE | 102012223664 A1 | 6/2014 |
| DE | 102018201159 A1 | 7/2019 |
| DE | 102018120847 A1 | 2/2020 |
| EP | 0220995 A1 | 5/1987 |
| EP | 1081725 A2 | 3/2001 |
| EP | 2151305 A1 | 2/2010 |
| EP | 2263444 A1 | 12/2010 |
| EP | 2395527 A1 | 12/2011 |
| EP | 2885962 A1 | 6/2015 |
| EP | 1616479 B1 | 11/2015 |
| EP | 3616860 A2 | 3/2020 |
| GB | 1329230 A | 9/1973 |
| GB | 2195569 A | 4/1988 |
| GB | 2244439 A | 12/1991 |
| GB | 2247198 A | 2/1992 |
| GB | 2306786 A | 5/1997 |
| GB | 2328635 A | 3/1999 |
| GB | 2372471 A | 8/2002 |
| JP | H0883 A | 1/1996 |
| JP | 2021170956 A | 11/2021 |
| WO | WO8903171 A1 | 4/1989 |
| WO | WO98014129 A1 | 4/1998 |
| WO | WO04032696 A2 | 4/2004 |
| WO | WO2004062077 A2 | 7/2004 |
| WO | WO2006003455 A1 | 1/2006 |
| WO | WO2007139273 A1 | 12/2007 |
| WO | WO2016155663 A1 | 10/2016 |

* cited by examiner

PRUNING SHEARS

CROSS-REFERENCE TO RELATED APPLICATIONS

This application claims priority to U.S. Provisional Patent Application No. 63/286,904 filed on Dec. 7, 2021, the entire content of which is incorporated herein by reference.

FIELD

The present disclosure relates to a landscaping tools, and more particularly to battery powered pruning shears.

BACKGROUND

Maintaining a property may require a significant amount of landscaping.

Landscaping includes mowing lawns, edging, trimming weeds, trimming bushes, trimming trees, etc. To accomplish these various tasks, a variety of tools may be utilized.

SUMMARY

In an embodiment of the present disclosure, pruning shears are disclosed and include a housing comprising a motor portion and a handle portion. A motor is disposed within the motor portion of the housing and a trigger assembly is disposed within the housing portion and operable to control the motor, wherein the trigger assembly includes a trigger and a trigger lock wherein the trigger lock prevents actuation of the trigger until the trigger lock is depressed.

In another embodiment of the present disclosure, pruning shears are disclosed and include a housing comprising a motor portion and a handle portion. The pruning shears further include a motor disposed within the motor portion of the housing, a frame extending from the motor portion of the housing, a support blade affixed to the frame, a rack gear operably coupled to the motor, a cutting blade adjacent to the support blade and coupled to the rack gear. Wherein the cutting blade and the support blade form a blade assembly. Further, the pruning shears comprise a switch installed along the motor portion of the housing, wherein the switch is movable between a first position in which a first speed of the motor is selected and a first maximum open position of the blade assembly is selected and a second position in which a second speed of the motor is selected and a second maximum open position of the blade assembly is selected.

In still another embodiment of the present disclosure pruning shears are disclosed and include a housing comprising a motor portion and a handle portion. Further, the pruning shears include a motor disposed within the motor portion of the housing, a trigger operatively coupled to the motor to control operation of the motor, a frame extending from the motor portion of the housing, a support blade affixed to the frame, a rack gear operably coupled to the motor, a cutting blade adjacent to the support blade and coupled to the rack gear, wherein the cutting blade and the support blade form a blade assembly, an inductive sensor place near the blade assembly to detect a position of the cutting blade relative to the support blade, and a controller operatively coupled to the inductive sensor, the motor, and the trigger, wherein at least partially based on the operation of the motor, operation of the trigger, and positions of the cutting blade, the controller selectively changes a speed of the motor and a maximum open position of the blade assembly.

Other features and aspects of the disclosure will become apparent by consideration of the following detailed description and accompanying drawings.

Before any embodiments of the present disclosure are explained in detail, it is to be understood that the embodiments described herein are not limited in scope or application to the details of construction and the arrangement of components set forth in the following description or as illustrated in the following drawings. The devices described herein are capable of other embodiments and of being practiced or of being carried out in various ways. Also, it is to be understood that the phraseology and terminology used herein is for the purpose of description and should not be regarded as limiting.

DETAILED DESCRIPTION

Figure 5:
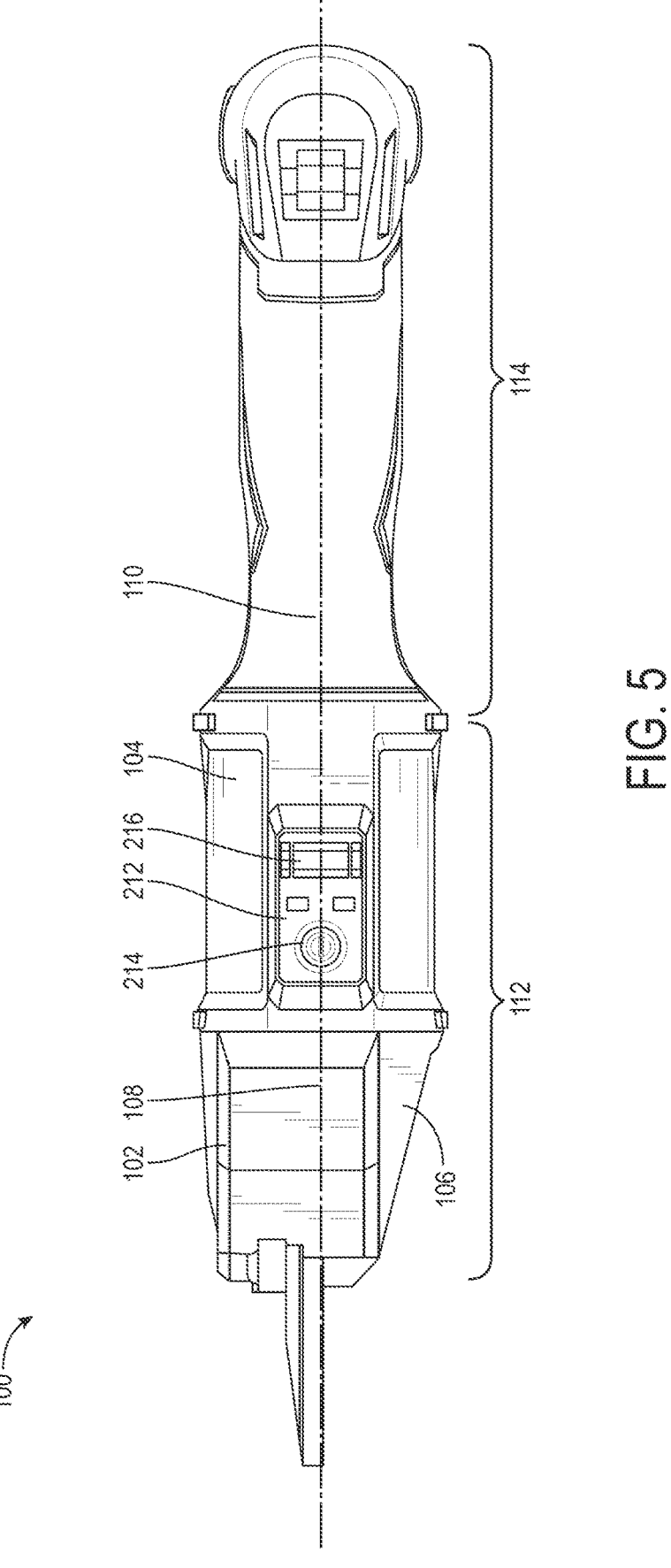
FIG. 5 is a top view of the pruning shears in accordance with an embodiment of the present disclosure.
Figure 6:
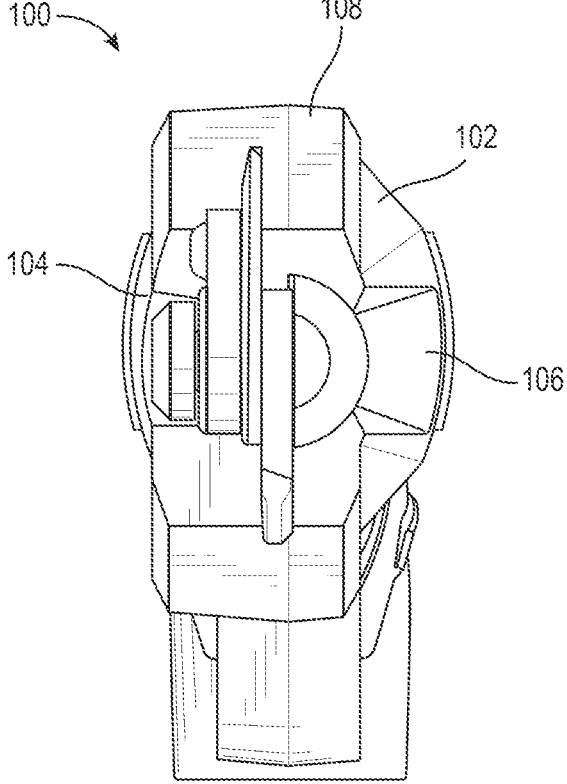
FIG. 6 is a front view of the pruning shears in accordance with an embodiment of the present disclosure.

Referring to FIG. 1 through FIG. 6, pruning shears are illustrated and are generally designated 100. As illustrated, the pruning shears 100 include a housing 102 that includes a first housing side 104 and a second housing side 106. As best shown in FIG. 5, the housing sides 104, 106 meet to form an interface 108 along a longitudinal axis 110. It is to be understood that the housing sides 104, 106 are attached, or otherwise affixed, to each other via a plurality of fasteners, e.g., screws, that are not shown in the figures. Alternatively, the housing sides 104, 106 are affixed to each other via an adhesive or via a plastic welding operation.

FIG. 1 through FIG. 7 indicate that the housing 102 defines a motor portion 112 and a handle portion 114. The motor portion 112 includes a motor 120 that has a rotating drive shaft 122. A fan rotor 124 is disposed on the drive shaft 122 and rotates with the drive shaft 122. Further, a gear box 126 is operatively coupled to the drive shaft 122 and includes an output shaft 128. As shown, a pinion gear 130 is disposed on, or operatively coupled, to the output shaft 128 of the gear box 126. In a particular embodiment, the pinion gear 130 is a bevel pinion gear and is generally frustoconical shaped. Further, the pinion gear 130 is a spiral bevel pinion gear.

Figure 1:
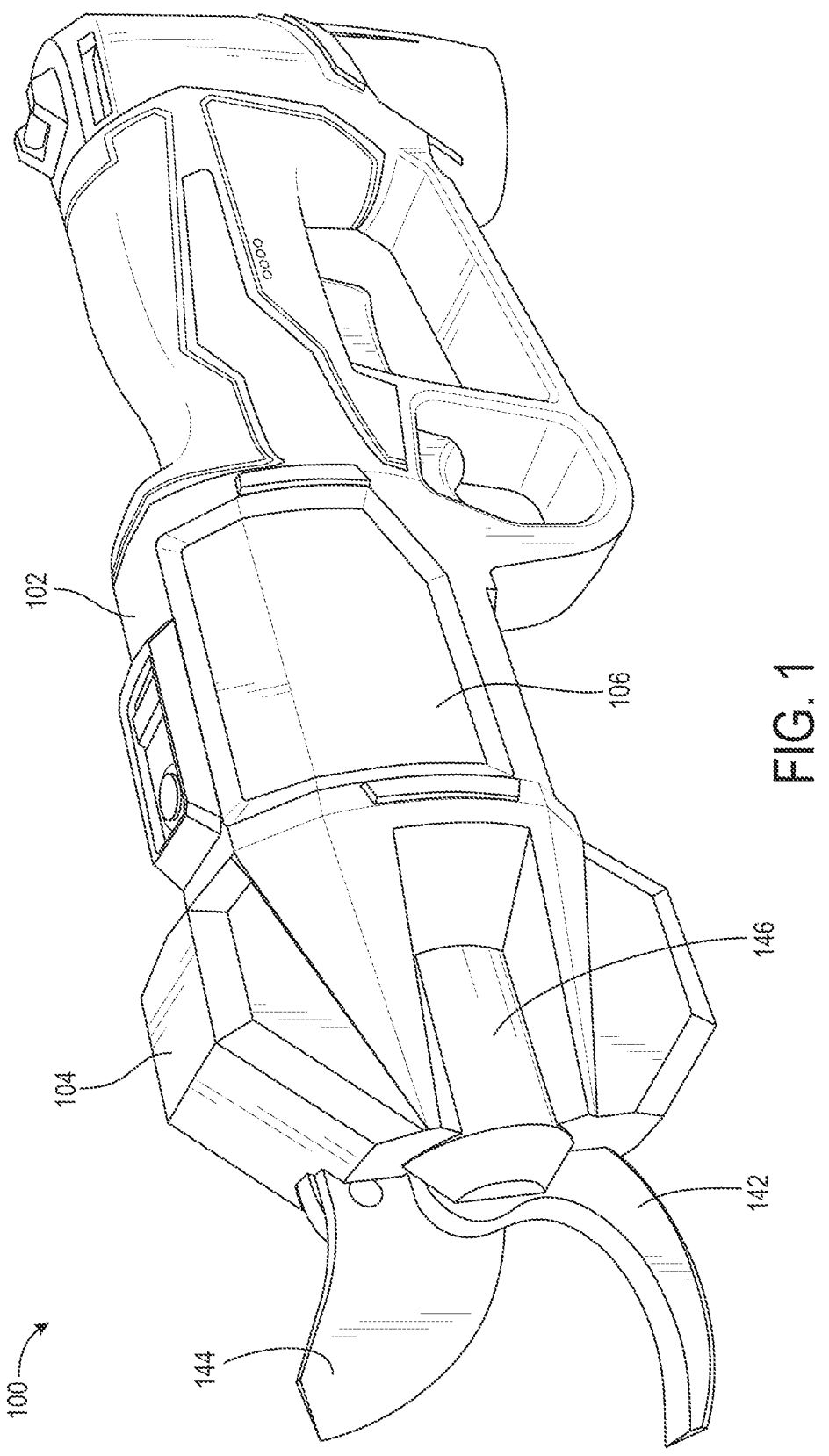
FIG. 1 is a perspective view of pruning shears in accordance with an embodiment of the present disclosure.
Figure 2:
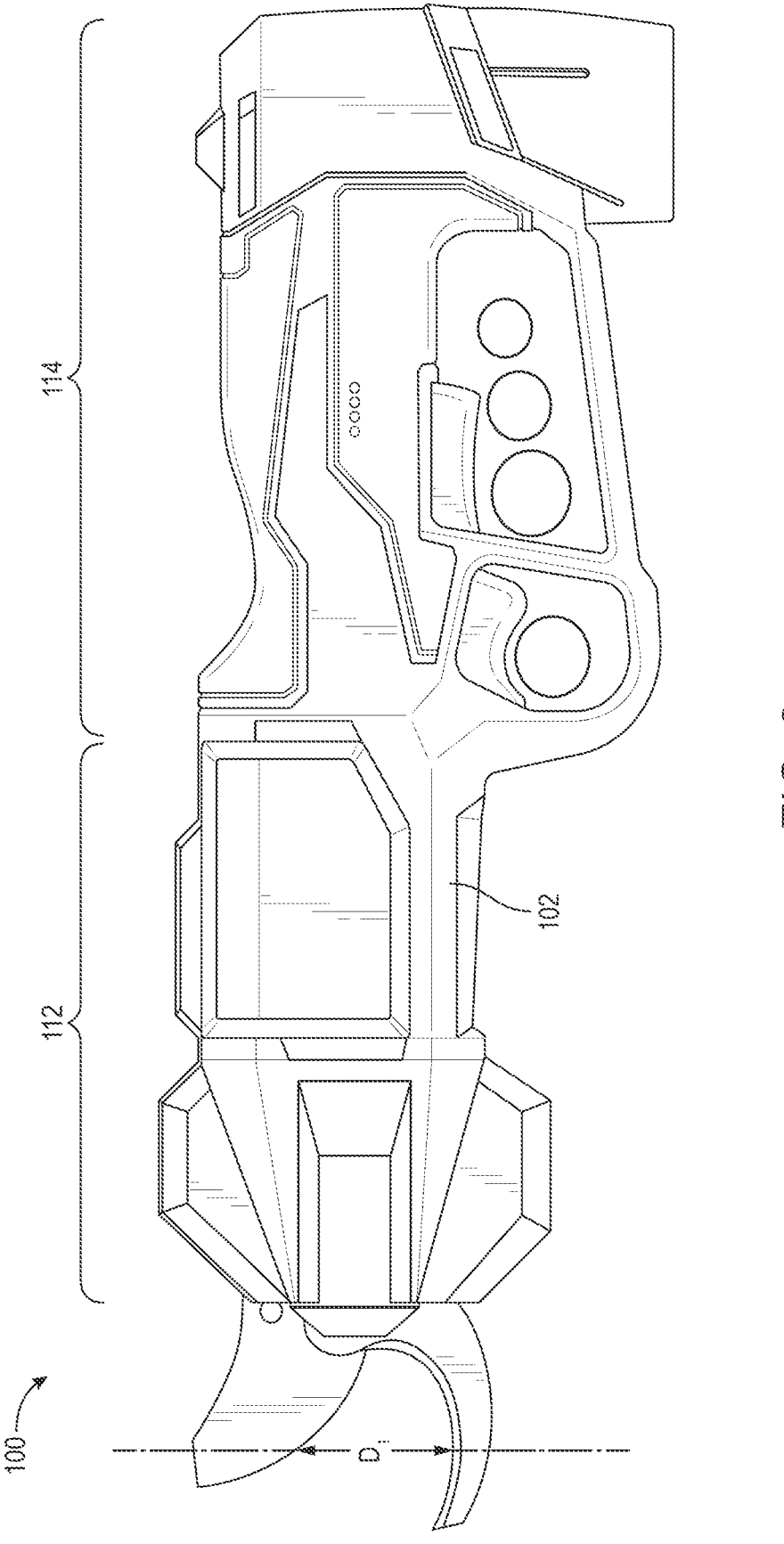
FIG. 2 is a left side view of the pruning shears with the blades in a first maximum open position in accordance with an embodiment of the present disclosure.
Figure 3:
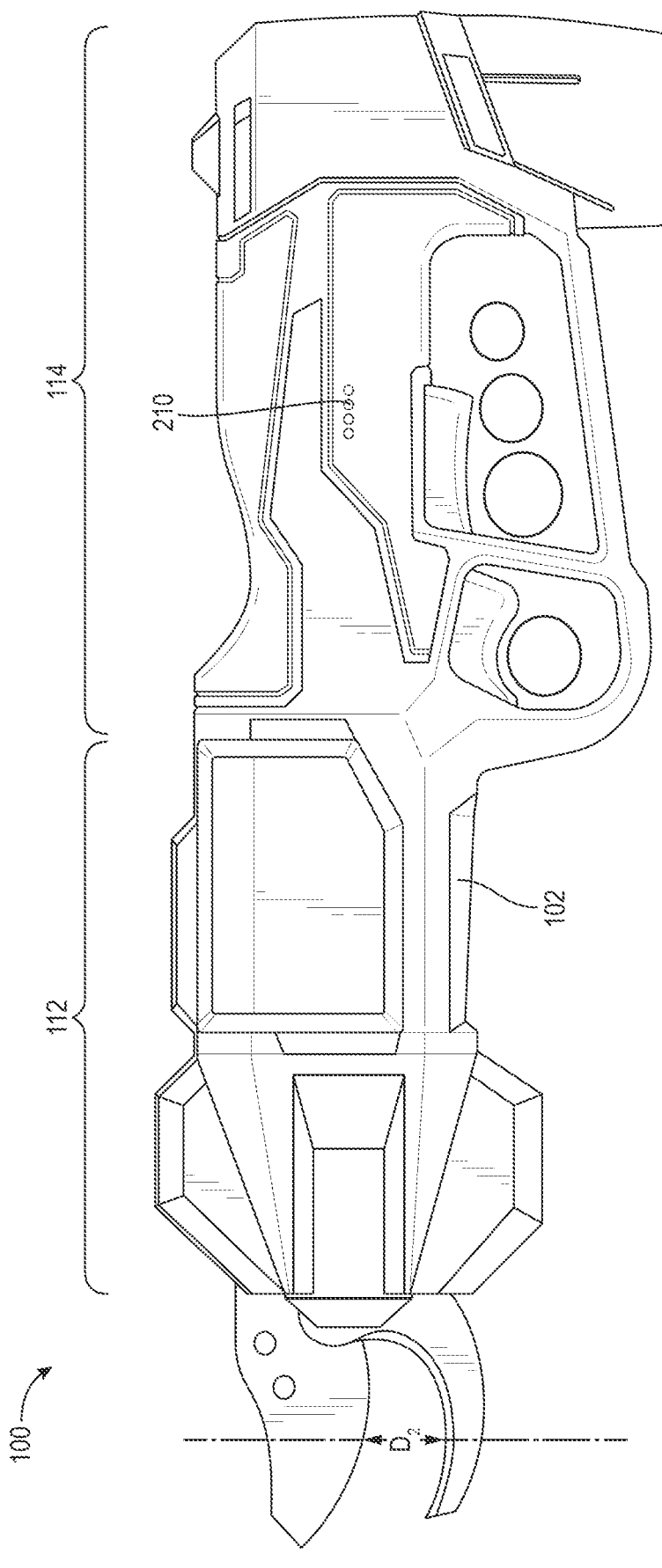
FIG. 3 is a left side view of the pruning shears with the blades in a second maximum open position in accordance with an embodiment of the present disclosure.
Figure 4:
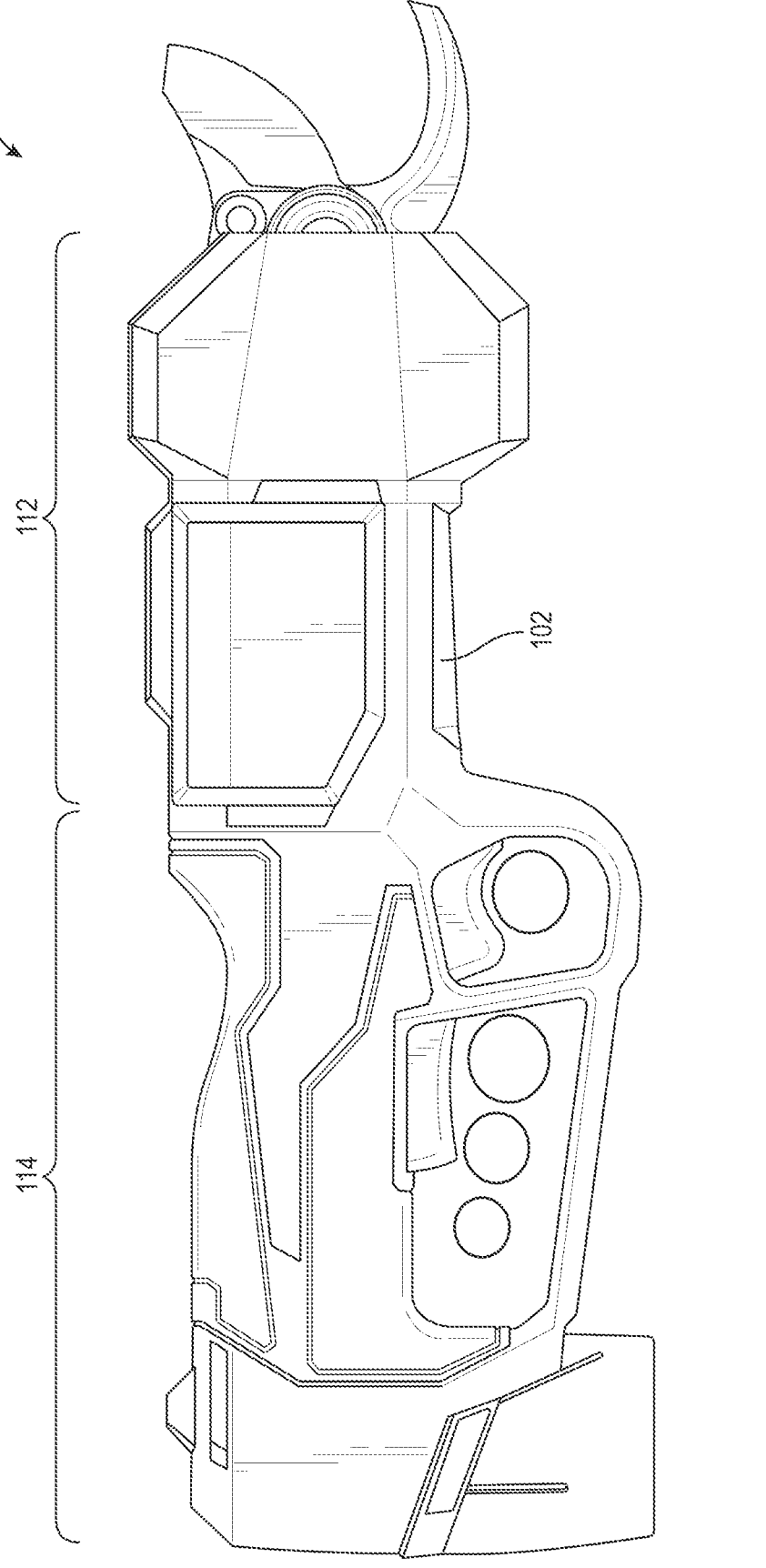
FIG. 4 is a right side view of the pruning shears in accordance with an embodiment of the present disclosure.
Figure 8:
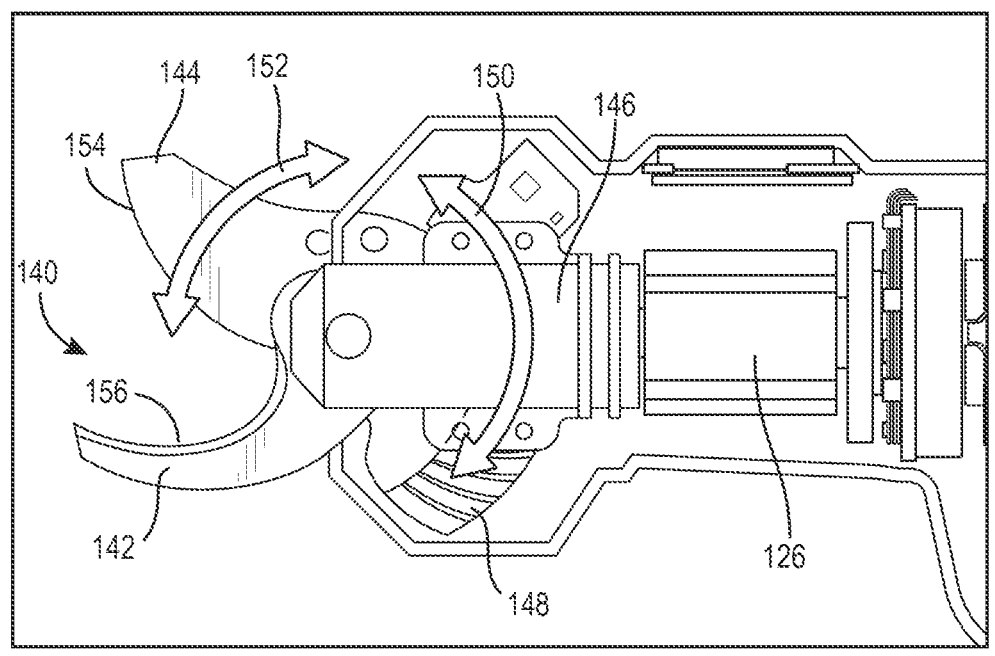
FIG. 8 is a partial left side view of the pruning shears in accordance with an embodiment of the present disclosure with a portion of the housing removed.
Figure 9:
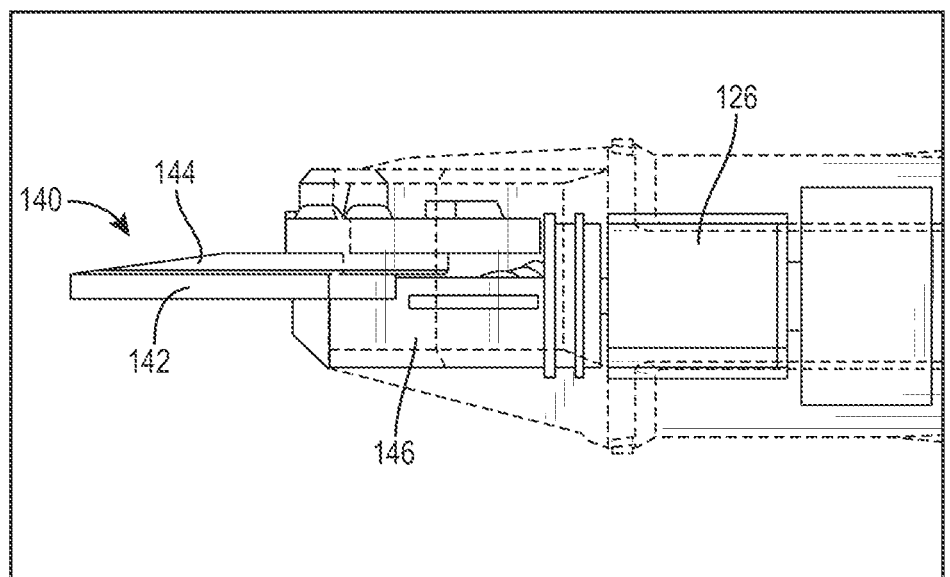
FIG. 9 is a partial top view of the pruning shears in accordance with an embodiment of the present disclosure with a portion of the housing represented by dashed lines.

As best illustrated in FIG. 8 and FIG. 9, a blade assembly 140 extends, at least partially, from the motor portion 112 of the housing 102 so that it is at least partially external to the housing 102. In other words, the pruning shears 100 include a blade assembly 140 that extends from the housing 102. The blade assembly 140 includes a support blade 142 and a cutting blade 144 adjacent to the support blade 142. The pruning shears 100 further include a frame 146 that is statically mounted within the housing 102 of the pruning shears 100. As depicted in FIG. 1 through FIG. 3, the frame 146 partially extends from the housing 102 of the pruning shears 100. The support blade 142 is mounted on the frame 146 and the support blade 142 and the frame 146 are stationary and do not move with respect to the housing 102. The cutting blade 144 is operably coupled, or affixed, to an arcuate rack gear 148. In an embodiment, the arcuate rack gear 148 is a spiral arcuate rack gear. The arcuate rack gear 148 is engaged with the pinion gear 130 and as the pinion gear 130 rotates clockwise and counterclockwise, the arcuate rack gear 148 moves back-and-forth along a curved path indicated by curved arrow 150. Moreover, as the arcuate rack gear 148 moves back-and-forth along the path indicated by curved arrow 150, the cutting blade 144, affixed to the arcuate rack gear 148, moves back-and-forth along the path indicate by curved arrow 152. In particular, the cutting blade 144 moves back-and-forth along the path indicated by curved arrow 152 and in doing so, moves towards and away from the support blade 142.

During use, the cutting blade 144 reciprocates from a maximum open position to a closed position relative to the support blade 142. In the maximum open position, a cutting edge 154 of the cutting blade 144 is spaced a maximum distance from a cutting edge 156 of the support blade 142. Conversely, in the closed position, the cutting edge 154 of the cutting blade 144 moves slightly past the cutting edge 156 of the support blade 142. It is to be understood that the blade assembly 140 of the pruning shears 100 can have a first maximum open position, depicted in FIG. 2, and a second maximum open position, depicted in FIG. 3. In the first maximum open position, the blade assembly 140 of the pruning shears 100 defines, or includes, a first maximum open distance, $D_1$, measured along a vertical axis 158 passing through the lowest point of the cutting edge 156 of the support blade 142 between the cutting edge 154 of the cutting blade 144 and the cutting edge 156 of the support blade 142. Moreover, in the second maximum open position, the blade assembly 140 of the pruning shears 100 defines, or includes a second maximum open distance, $D_2$, measured along the vertical axis 158 passing through the lowest point of the cutting edge 156 of the support blade 142 between the cutting edge 154 of the cutting blade 144 and the cutting edge 156 of the support blade 142.

As illustrated in FIG. 2 and FIG. 3, $D_1$ is greater than $D_2$. Moreover, in first maximum open position, the pruning shears 100 include a first cutting speed, $S_1$, and in the second maximum open position, the pruning shears 100 include a second cutting speed, $S_2$. In a particular embodiment, $S_1$ is less than, or slower than, $S_2$. The different maximum open positions and different speeds allow the pruning shears 100 efficiently cut branches of a certain size. For example, for larger branches the pruning shears 100 may be switched to the first cutting speed, $S_1$, i.e., the slower operational speed, and the first maximum open distance, $D_1$, i.e., the larger maximum open distance. This configuration of the larger maximum open distance and the slower speed allows the pruning shears 100 to be used to cut larger branches while maximizing efficiency and battery life. When cutting smaller branches, the pruning shears may be switched to the second cutting speed, $S_2$, i.e., the faster operation speed, and the second maximum distance, $D_2$, i.e., the smaller maximum open distance. This configuration of the smaller maximum open distance and the faster speed allows the pruning shears 100 to be used to cut smaller branches while also maximizing efficiency and battery life.

Referring back to FIG. 7, the handle portion 114 of the housing 102 includes a printed circuit board (PCB) 160 therein. The PCB 160 is operably coupled to a battery 162 that is removably engaged with a battery compartment 164 that is formed within the handle portion 114 of the housing 102. The PCB 160 is also operably coupled to the motor 120 within the motor portion 112 of the housing 102 and a trigger assembly 170 that is at least partially disposed within the handle portion 114 of the housing 102.

Figure 7:
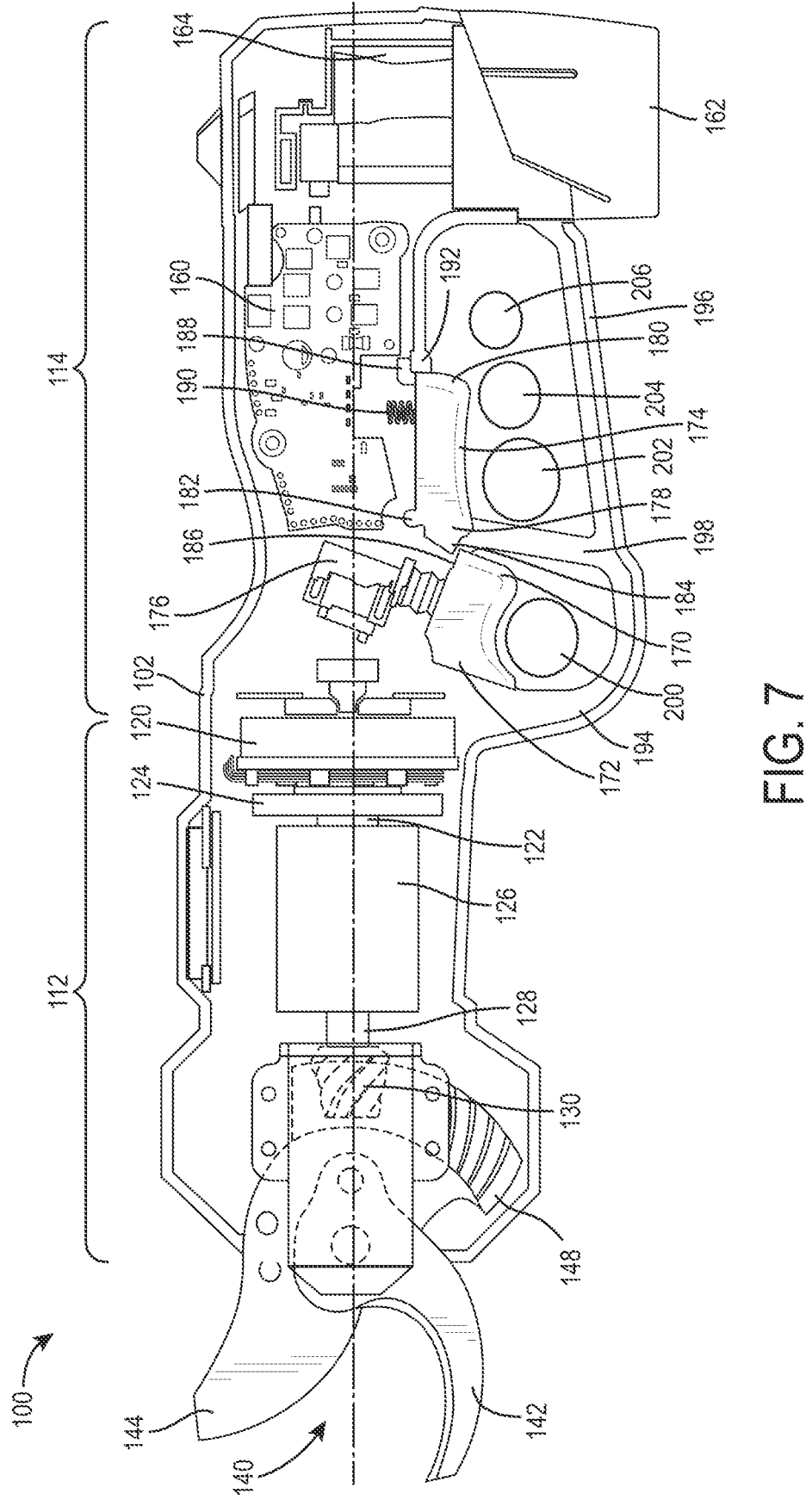
FIG. 7 is a left side view of the pruning shears in accordance with an embodiment of the present disclosure with a portion of the housing removed.

As shown in FIG. 7, the trigger assembly 170 includes a trigger 172 and a trigger lock 174. When unlocked, the trigger 172 slides linearly relative to the housing 102 in order to depress and release a switch 176 that is operably connected to the motor 120. The trigger lock 174 prevents the trigger 172 from moving relative to the housing 102 until the trigger lock 174 is depressed and the trigger 172 is released. As shown, the trigger lock 174 defines a proximal end 178 and a distal end 180. The proximal end 178 of the trigger lock 174 includes a pivot 182 and a detent 184. When the trigger lock 174 is in the locked position, the detent 184 engages an inner surface 186 of the trigger 172 to prevent movement of the trigger 172. The trigger lock 174 also includes a trigger lock stop 188 that extends from the distal end 180 of the trigger lock 174.

In a particular embodiment, the trigger lock stop 188 prevents the trigger lock 174 from rotating out of the handle portion 114 of the housing 102. A spring 190 is installed within the handle portion 114 of the housing 102 adjacent to the distal end 180 of the trigger lock 174 in order to bias the trigger lock 174 to the locked position in which the detent 184 engages the trigger 172 and the trigger lock stop 188 is against an inner wall 192 of the handle portion 114 of the housing 102. It is to be understood that the trigger lock 174 rotates about the pivot 182 between a locked position in which the detent 184 engages the trigger 172 and prevents movement of the trigger 172 relative to the housing 102 and an unlocked position in which the detent 184 rotates away from the trigger 172, disengages the trigger 172, and allows movement of the trigger 172.

As further illustrated in FIG. 7, the handle portion 114 of the housing 102 includes a trigger guard 194 that extends at least partially around the trigger 172, i.e., the portion of the trigger 172 that extends outwardly, or externally, from the handle portion 114 of the housing 102. Further, the handle portion 114 of the housing 102 includes a trigger lock guard 196 that extends at least partially around the trigger lock 174, i.e., the portion of the trigger lock 174 that extends outwardly, or externally, from the handle portion 114 of the housing 102. As shown in FIG. 7, the trigger guard 194 is separate from the trigger lock guard 196 and a divider 198 extends between the trigger guard 194 and the trigger lock guard 196. In a particular embodiment, the trigger guard 194 is sized and shaped to receive an index finger 200 of a user. Moreover, the trigger lock guard 196 is sized and shaped to receive a middle finger 202, a ring finger 204, and a pinky finger 206 of the use. Thus, during operation, a user can grip the pruning shears 100 around the handle portion 114 of the housing 102 and can use one or more of the middle finger 202, ring finger 204, and pinky finger 206 to actuate the trigger lock 74 and release the trigger 172. At the same time, a user can use the index finger 200 to actuate the trigger 172 while the trigger lock 174 is in the unlocked position.

Referring briefly to FIG. 3, the pruning shears 100 further include a battery level indicator 210. The battery level indicator 210 can include a series of light emitting diodes (LEDs) or other lights that indicate the level of battery remaining based on a number of LEDs lit. For example, when a battery level is at maximum all of the LEDs of the battery level indicator 210 are lit. As the battery level decreases, the number of LEDs of the battery level indicator 210 that are lit may decrease. FIG. 5 indicates that the pruning shears 100 also includes a user interface 212 disposed on a top of the housing 102. The user interface 212 includes a display 214 that indicates the current power state (on or off) and the current operation mode of the pruning shears 100. The user interface 212 also includes a switch 216 that is used to switch between the operation modes provided by the pruning shears 100, e.g., different speeds and different maximum open positions, as described above.

Figure 10:
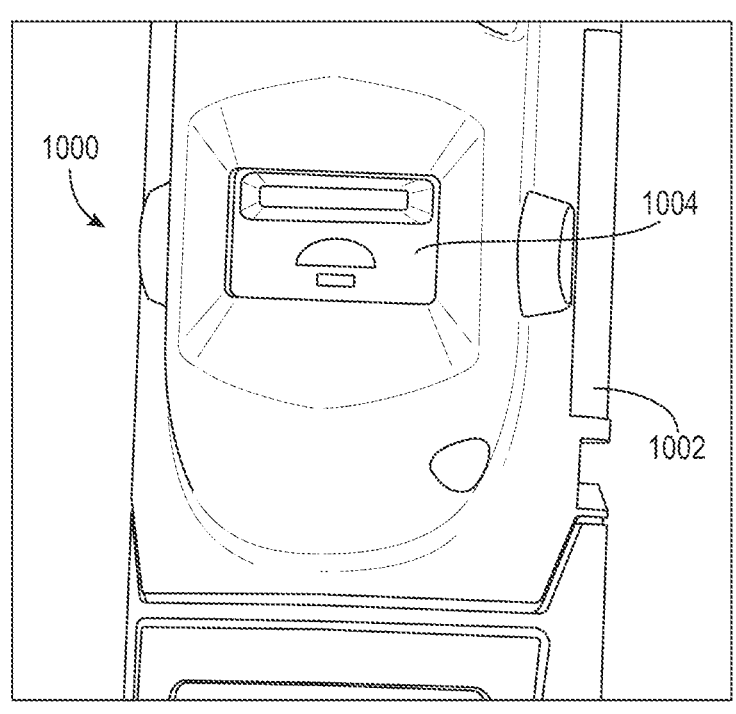
FIG. 10 is a partial top view of pruning shears in accordance with an embodiment of the present disclosure showing an electromechanical mode selector.
Figure 11:
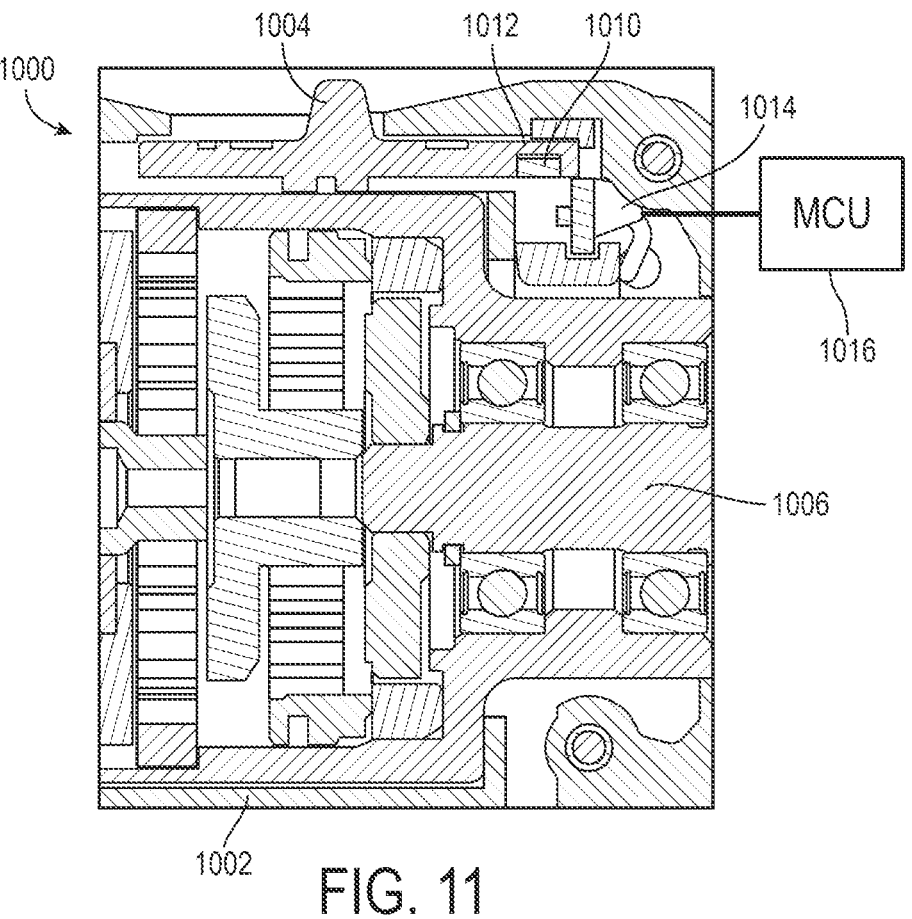
FIG. 11 is a partial cross-section view of the pruning shears in accordance with an embodiment of the present disclosure with a portion of the housing removed to show details of the electromechanical mode selector.

Referring to FIGS. 10 and 11, an electromechanical mode selector 1000 for pruning shears 1002 is illustrated. As shown, the mode selector 1000 includes a mechanical selector switch 1004 that mechanically switches a gear box 1006 within the pruning shears 1002. The mechanical selector switch 1004 may be used to switch between planetary gear stages of the gear box 1006, e.g., between a high speed and a low speed. The mechanical selector switch 1004 may include a magnet 1010 disposed on an end 1012 of the mechanical selector switch 1004. A hall sensor 1014 may be placed near the mechanical selector switch 1004 within the pruning shears 1002. When the mechanical selector switch 1004 is moved forward, relative to FIG. 11, into a slow speed (higher torque), the hall sensor 1014 can sense the position of the mechanical selector switch 1004 and can transmit a signal to a motor control unit (MCU) 1016. The MCU 1016 may use the signal from the hall sensor 1014 to determine the desired cut capacity mode based on the selected speed.

For example, for the low speed, the cut capacity may be the higher cut capacity, e.g., the cut capacity corresponding to the larger first maximum distance, $D_1$, described above. Conversely, when the mechanical selector switch 1004 is moved backward, relative to FIG. 11, into a high speed (lower torque), the MCU 1016 will not receive a signal from the hall sensor 1014 and the MCU 1016 may return the cut capacity mode to the lower cut capacity, e.g., the cut capacity corresponding to the smaller second maximum distance, $D_2$, described above. After a new speed is selected, and the trigger is pulled once, the cutting blade 144 can stop in the position corresponding to the new stopping position corresponding to the maximum open distance based on input from an inductive sensor, described below in conjunction with FIG. 18. In another embodiment, an inductive sensor or microswitch ma be used in lieu of the magnet 1010 and the hall sensor 1014.

Figure 12:
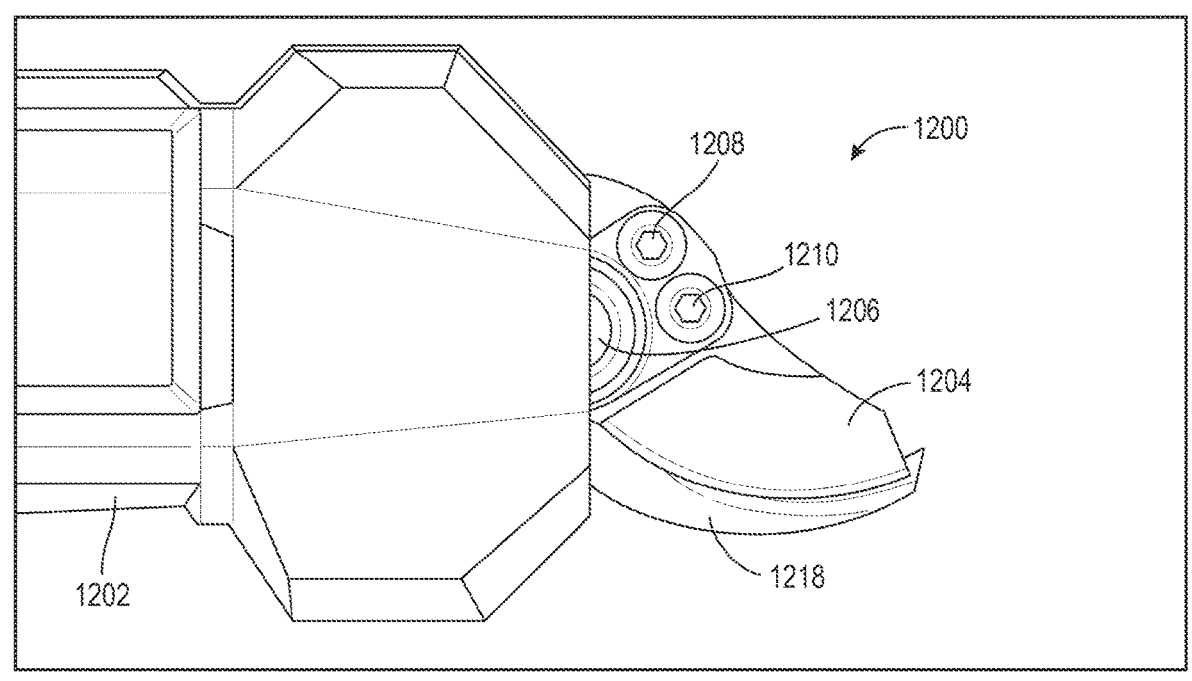
FIG. 12 is a partial right side view of pruning shears in accordance with an embodiment of the present disclosure showing a blade assembly.
Figure 13:
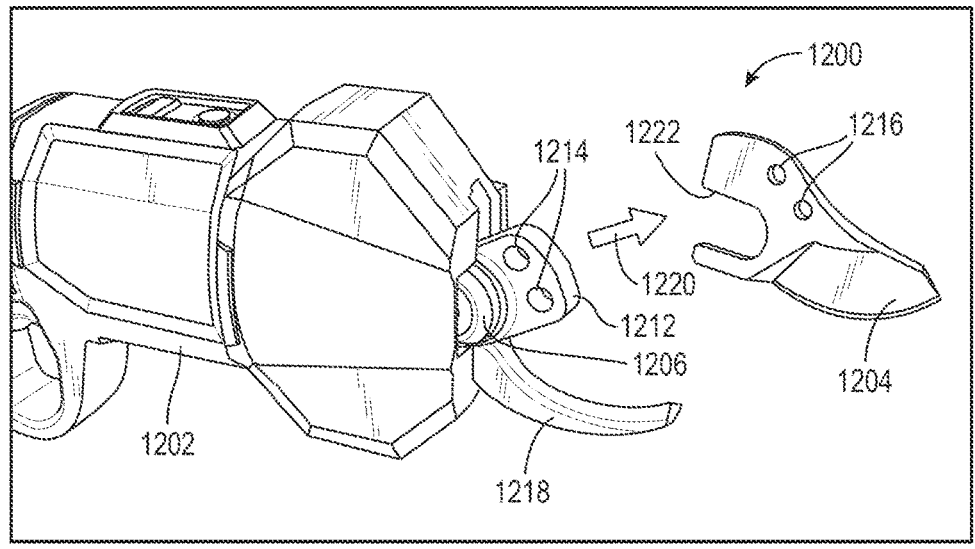
FIG. 13 is a partial right side view of the pruning shears with the upper blade of the blade assembly detached from the pruning shears in accordance with an embodiment of the present disclosure.

FIG. 12 and FIG. 13 illustrate a blade assembly 1200 for pruning shears 1202 and depict the removal of a cutting blade 1204 from the blade assembly 1200. To remove the cutting blade 1204 from the blade assembly 1200 and the pruning shears 1202, a locking screw 1206 may be loosened. Thereafter, a first blade screw 1208 and a second blade screw 1210 may be removed. It is to be understood that the blade screws 1208, 1210 connect the cutting blade 1204 to the arcuate rack gear 1212 that drives the motion of the cutting blade 1204. As indicated in FIG. 12 and FIG. 13, the blade screws 1208, 1210 extend through holes 1214 in the arcuate rack gear 1212 and threadably engage threaded holes 1216 formed in the cutting blade 1204.

As shown in FIG. 13, after the blade screws 1208, 1210 are removed, the cutting blade 1204 may be moved linearly away from the locking screw 1206 and the support blade 1218 of the blade assembly 1200, as indicated by arrow 1220. As shown, the cutting blade 1204 is formed with a generally U-shaped opening 1222 that is configured to fit over the shaft (not shown) of the locking screw 1206. This U-shaped opening 1222 facilitates the easy removal and replacement of the cutting blade 1204, as depicted in FIG. 12 and FIG. 13. It is to be understood that to install the cutting blade 1204 the steps, described above, may be reversed.

Figure 14:
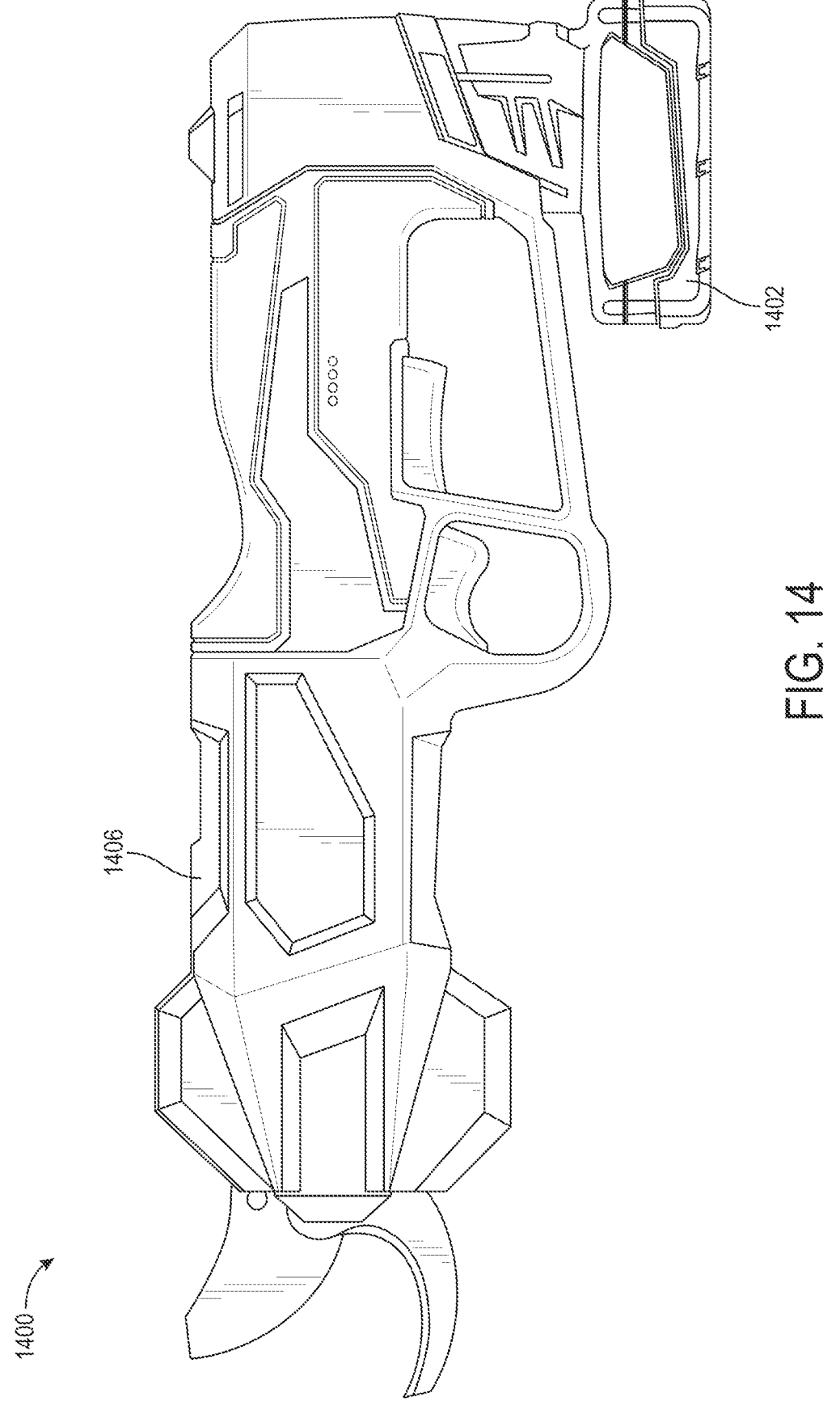
FIG. 14 is a left side view of pruning shears in accordance with another embodiment of the present disclosure.
Figure 15:
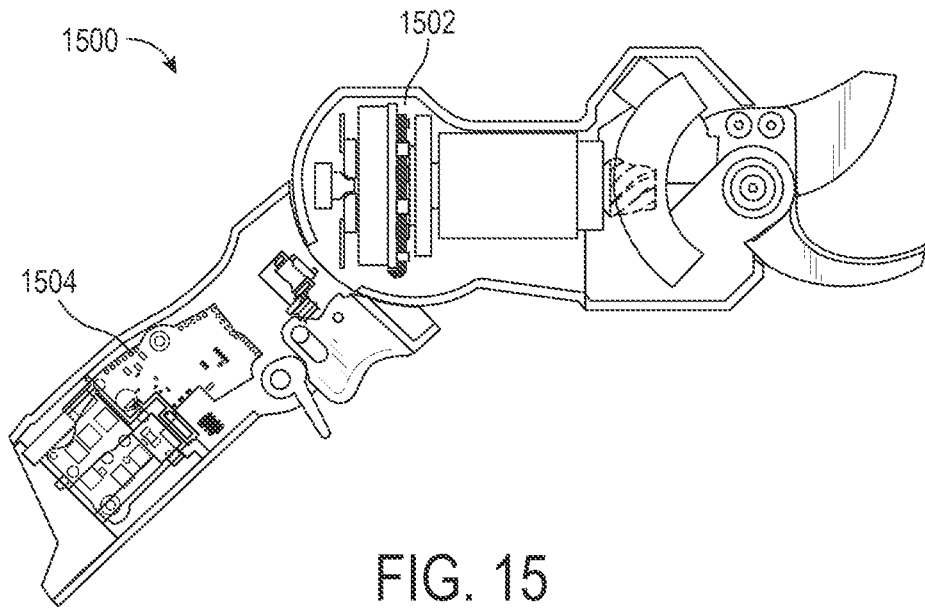
FIG. 15 is a first right side view of pruning shears in accordance with yet another embodiment of the present disclosure.
Figure 16:
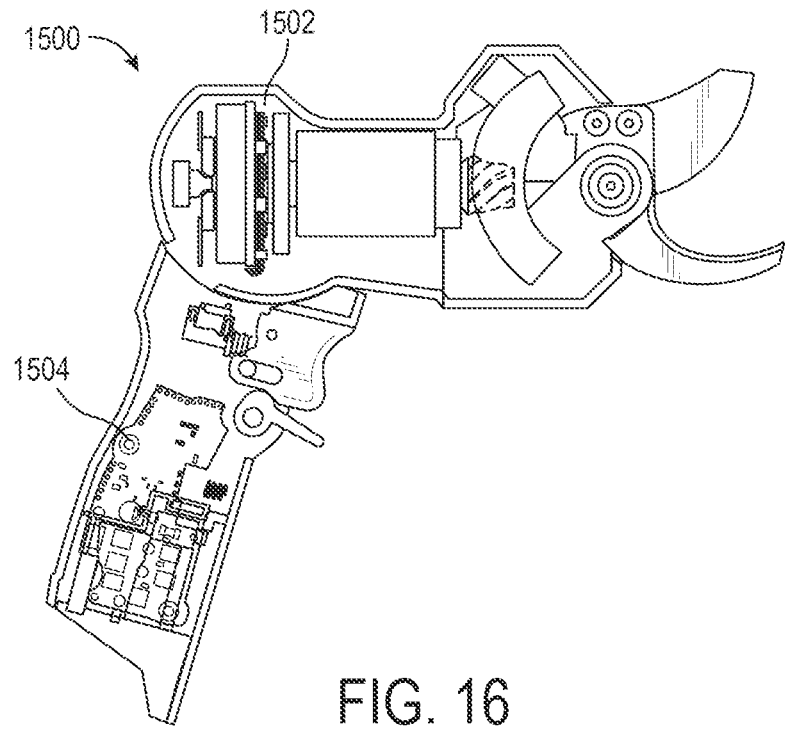
FIG. 16 is a second right side view of the pruning shears in accordance with yet another embodiment of the present disclosure.
Figure 17:
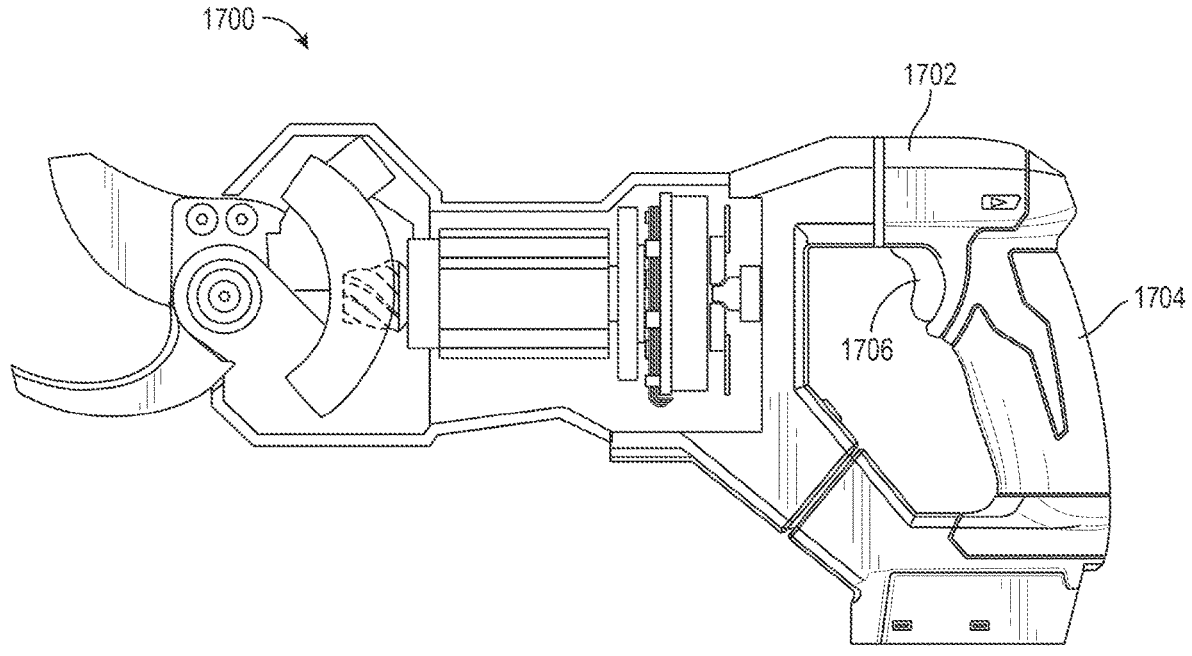
FIG. 17 is a left side view of pruning shears in accordance with still another embodiment of the present disclosure.

Referring briefly to FIG. 14, another embodiment of pruning shears 1400 are depicted. In this particular embodiment, the pruning shears 1400 include a larger capacity battery 1402 engaged with the housing 1406 of the pruning shears 1400. FIG. 15 and FIG. 16 depict another embodiment of pruning shears 1500. In this embodiment, the pruning shears 1500 include a first housing portion 1502 and a second housing portion 1504. The second housing portion is 1504 is pivotably connected to the first housing portion 1502 to allow the second housing portion 1504 to be rotated between a first position relative to the first housing portion 1502, as shown in FIG. 15, and a second position relative to the first housing portion 1502, as shown in FIG. 16. FIG. 17 illustrate still another embodiment of pruning shears 1700 in which the housing 1702 includes a pistol grip 1704 having a single trigger 1706.

Figure 18:
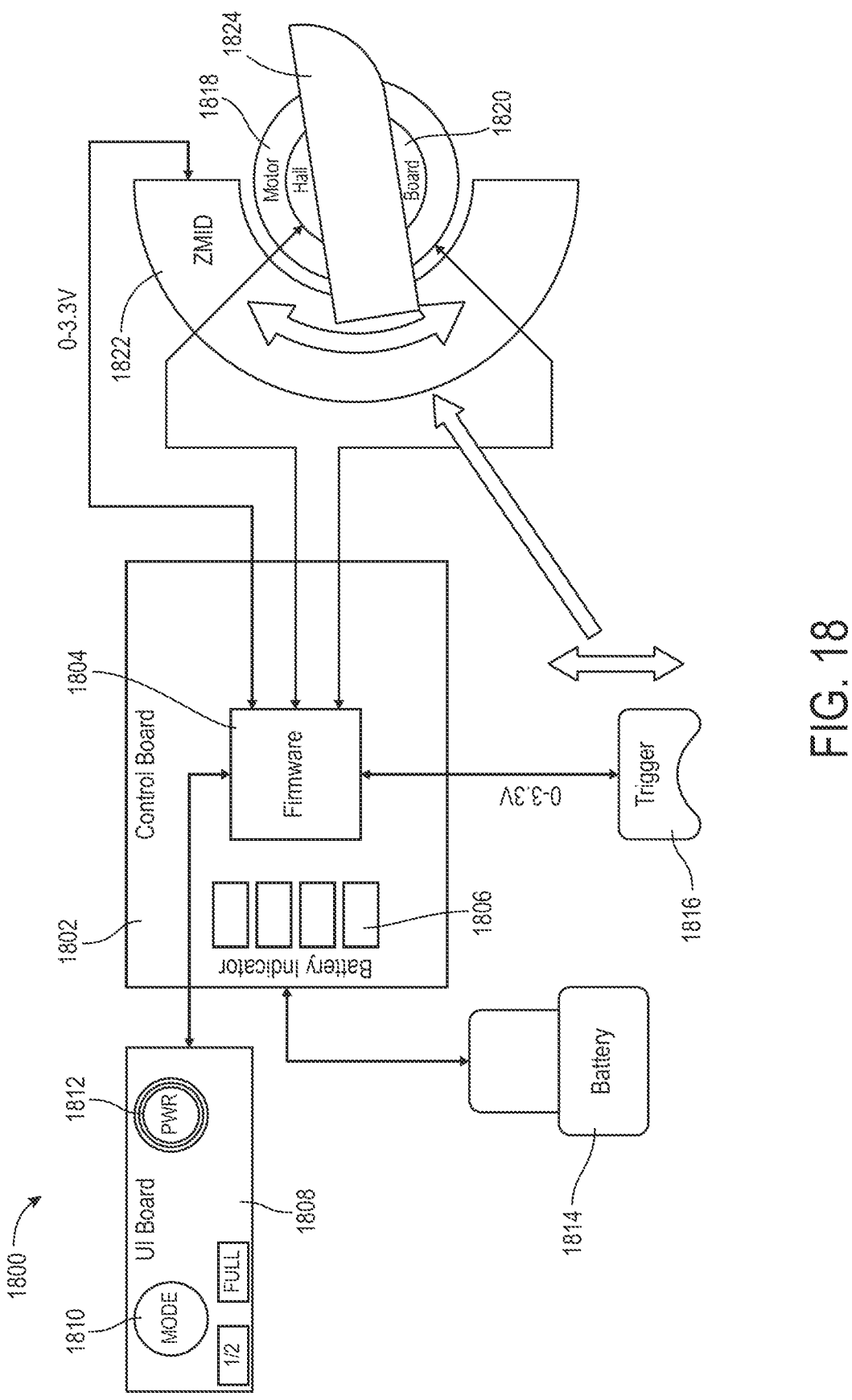
FIG. 18 is a schematic diagram of a control system for pruning shears in accordance with an embodiment of the present disclosure.

Referring now to FIG. 18, a control system for pruning shears is depicted and is generally designated 1800. As illustrated, the control system 1800 includes a control board 1802. The control board 1802 includes firmware 1804 and a battery indicator 1806. A user interface board 1808 is connected to the control board 1802. The user interface board 1808 includes a mode indicator 1810 and a power on/off indicator 1812. FIG. 18 further indicates that a battery

1814 is connected to the control board 1802. The battery indicator 1806 indicates the remaining battery level for the battery 1814. A trigger 1816 and a motor 1818 are also operably coupled to the control board 1802. The trigger 1816 controls the operation of the motor 1818. A hall sensor 1820 and an inductive sensor 1822 are also connected to the control board 1802. As described elsewhere herein, the control board may control operation of the motor 1818 and a cutting blade 1824 at least partially based on the position of the cutting blade 1824 as indicated by the inductive sensor 1822 and operational mode may be selected by a user via the user interface board 1808 or automatically based on position data of the cutting blade 1824.

Figure 19:
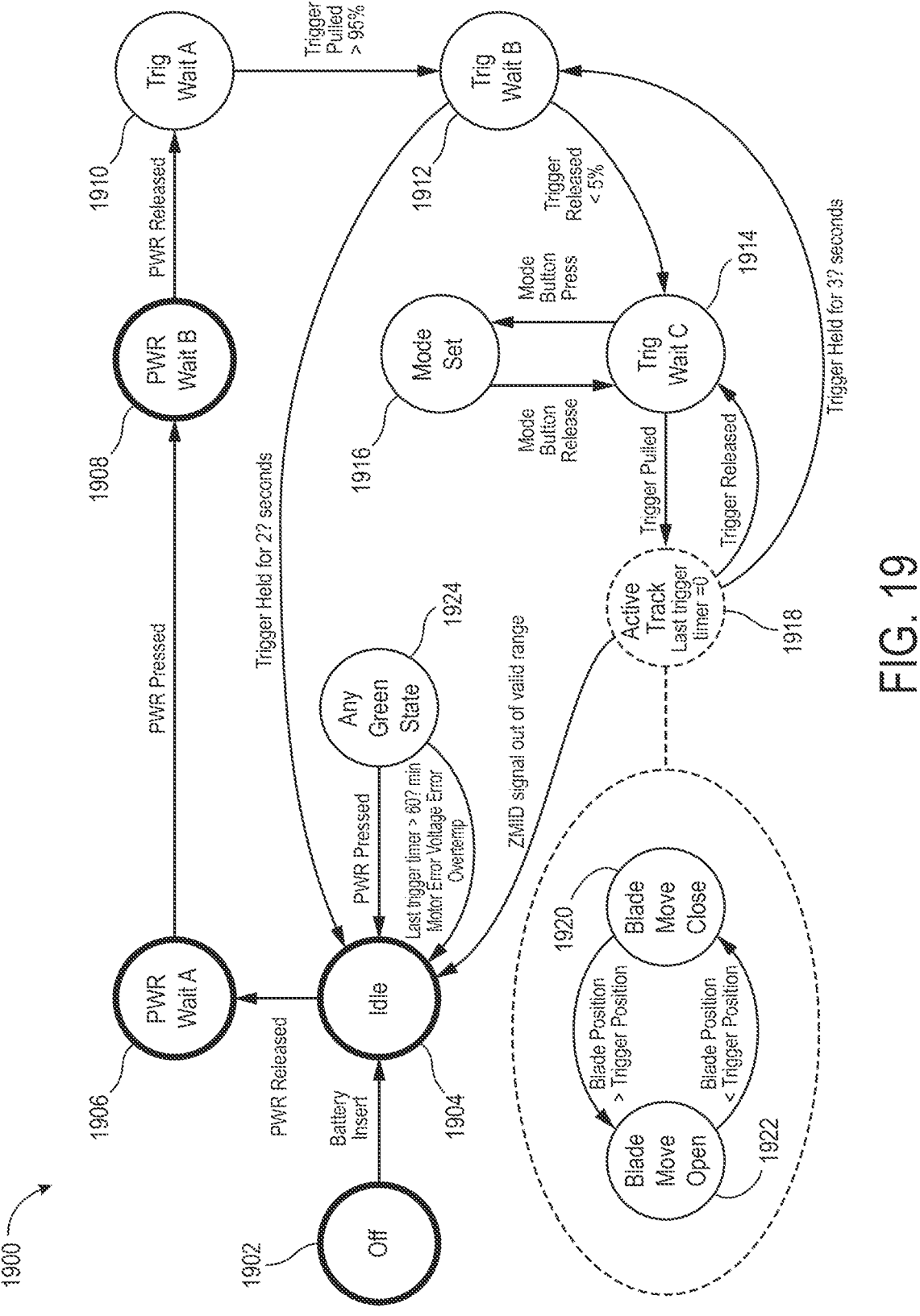
FIG. 19 is an operational diagram for pruning shears in accordance with an embodiment of the present disclosure.

FIG. 19 illustrates an operation diagram of pruning shears according to an embodiment. As shown, the operation 1900 may include several power off states. For example, the operation 1900 includes an off state 1902, an idle state 1904, a first power wait state 1906, and a second power wait state 1908. In the off state 1902, a battery is disengaged from the pruning shears. In the idle state 1904, the battery is engaged with the pruning. In the first power wait state 1906, the power is off. In the second power wait state 1908, the power is on, but the trigger is not pressed.

As shown in FIG. 19, the operation 1900 includes several power on modes. For example, the operation 1900 includes a first trigger wait state 1910, a second trigger wait state 1912, and a third trigger wait state 1914. The first trigger wait state 1910 is simply a wait for the trigger to be pulled to energize the motor and operate the pruning shears. This moves to the second trigger wait state 1912 while the motor is running and the pruning shears are operating. When the trigger is released, the operation moves to the third trigger wait state 1914. At the third trigger wait state 1914, a mode set 1916 may be triggered and a speed and maximum open distance may be selected by a user. Thereafter, when the trigger is pulled, the operation may enter the active track state 1918 in which the control system, described above, can actually track the position of the cutting blade and alter the maximum open distance of the cutting blade based on the trigger pull and the position of the blade. The operation 1900 may automatically change the maximum open distance of the cutting blade. For example, at the blade move close state 1920, the maximum open distance can be reduced to the smaller of the maximum open distances. Further, at the blade move open state 1922, the operation 1900 the maximum open distance of the cutting blade can be moved to the larger of the maximum open distances. At any power on (or green) state 1924, if the power is pressed, i.e., turned off, the operation 1900 can return to the idle state 1904. Also, at any power on state, if the trigger is held for more than sixty minutes, an error may state may be entered and the pruning shears may be automatically powered off.

EMBODIMENTS

Embodiment 1. Pruning shears, comprising:
a housing comprising
a motor portion; and
a handle portion;
a motor disposed within the motor portion of the housing; and
a trigger assembly disposed within the housing portion and operable to control the motor, wherein the trigger assembly includes a trigger and a trigger lock wherein the trigger lock prevents actuation of the trigger until the trigger lock is depressed.

Embodiment 2. The pruning shears of embodiment 1, wherein the trigger lock prevents the trigger from moving relative to the housing until the trigger lock is depressed and the trigger is released.

Embodiment 3. The pruning shears of embodiment 1, wherein the trigger lock defines a proximal end and a distal end, the proximal end includes a pivot and a detent to engage the trigger to prevent movement of the trigger.

Embodiment 4. The pruning shears of claim 3, wherein the distal end of the trigger lock includes a trigger lock stop to prevent the trigger lock from rotating out of the handle portion of the housing.

Embodiment 5. The pruning shears of embodiment 3, wherein the trigger lock rotates about the pivot between a locked position in which the detent engages the trigger and prevents movement of the trigger relative to the housing and an unlocked position in which the detent disengages the trigger and allows movement of the trigger.

Embodiment 6. The pruning shears of embodiment 3, wherein the trigger lock is biased to the locked position by a spring.

Embodiment 7. The pruning shears of embodiment 6, wherein the spring is installed adjacent to the distal end of the trigger lock.

Embodiment 8. The pruning shears of embodiment 1, wherein the handle portion of the housing includes a trigger guard at least partially around the trigger and a trigger lock guard at least partially around the trigger lock.

Embodiment 9. The pruning shears of embodiment 8, wherein the trigger guard is sized and shaped to receive an index finger of a user.

Embodiment 10. The pruning shears of embodiment 9, wherein the trigger lock guard is sized and shaped to receive a middle finger, a ring finger, and a pinky finger of the use.

Embodiment 11. Pruning shears, comprising:
a housing comprising
a motor portion; and
a handle portion;
a motor disposed within the motor portion of the housing;
a frame extending from the motor portion of the housing;
a support blade affixed to the frame;
a rack gear operably coupled to the motor;
a cutting blade adjacent to the support blade and coupled to the rack gear, wherein the cutting blade and the support blade form a blade assembly; and
a switch installed along the motor portion of the housing, wherein the switch is movable between a first position in which a first speed of the motor is selected and a first maximum open position of the blade assembly is selected and a second position in which a second speed of the motor is selected and a second maximum open position of the blade assembly is selected.

Embodiment 12. The pruning shears of embodiment 11, wherein the first speed is slower than the second speed.

Embodiment 13. The pruning shears of embodiment 12, wherein the first maximum open position is larger than the second maximum open position.

Embodiment 14. The pruning shears of embodiment 11, wherein the second speed is faster than the first speed.

Embodiment 15. The pruning shears of embodiment 14, wherein the second maximum open position is smaller than the first maximum open position.

Embodiment 16. Pruning shears, comprising:
a housing comprising
a motor portion; and
a handle portion;
a motor disposed within the motor portion of the housing;

a trigger operatively coupled to the motor to control operation of the motor;

a frame extending from the motor portion of the housing;

a support blade affixed to the frame;

a rack gear operably coupled to the motor;

a cutting blade adjacent to the support blade and coupled to the rack gear, wherein the cutting blade and the support blade form a blade assembly;

an inductive sensor place near the blade assembly to detect a position of the cutting blade relative to the support blade; and a controller operatively coupled to the inductive sensor, the motor, and the trigger, wherein at least partially based on the operation of the motor, operation of the trigger, and positions of the cutting blade, the controller selectively changes a speed of the motor and a maximum open position of the blade assembly.

Embodiment 17. The pruning shears of embodiment 16, wherein the controller selectively changes the motor between a first speed and second speed, wherein the first speed is slower than the second speed.

Embodiment 18. The pruning shears of embodiment 17, wherein the controller selectively changes to the maximum open position of the blade assembly between a first maximum open position and a second maximum open position, wherein the first maximum open position is greater than the second maximum open position.

Embodiment 19. The pruning shears of embodiment 17, wherein the handle portion of the housing rotates relative to the motor portion of the housing.

Embodiment 20. The pruning shears of embodiment 17, wherein the cutting blade is disengaged from the pruning shears by loosening, but not removing, a locking screw and removing at least one blade screw that is threadably engaged with the cutting blade.

Various features of the invention are set forth in the following embodiments.

What is claimed is:

1. Shears, comprising:

a housing comprising a motor portion at which a motor and a rack gear is disposed, the rack gear operably coupled to the motor; and a handle portion comprising a trigger operatively coupled to the motor to control operation of the motor, the handle portion comprising a trigger lock configured to prevent actuation of the trigger until the trigger lock is depressed;

a frame extending from the motor portion of the housing;

a support blade affixed to the frame;

a cutting blade adjacent to the support blade and coupled to the rack gear, wherein the cutting blade and the support blade form a blade assembly;

an inductive sensor placed near the blade assembly to detect a position of the cutting blade relative to the support blade; and a control board operatively coupled to the inductive sensor, the motor, and the trigger, the control board configured to control operation of the motor and the cutting blade based on a position of the cutting blade as indicated by the inductive sensor, wherein the control board is configured to cause the shears to perform operations, the operations comprising a trigger wait state corresponding to release of the trigger via actuation of the trigger lock, wherein, after the trigger is pulled, the operations comprise an active track state in which a maximum open distance of the cutting blade is alterable, via the rack gear, based on a trigger pull, and the position of the cutting blade.

2. The shears of claim 1, wherein the operations comprise, at a blade move close state, reducing, to a smaller of maximum open distances, the cutting blade.

3. The shears of claim 2, wherein the operations comprise, at a blade move open state, moving, to a larger of maximum open distances, the cutting blade.

4. The shears of claim 2, wherein the handle portion of the housing rotates relative to the motor portion of the housing.

5. The shears of claim 2, wherein the cutting blade is disengaged from the shears by loosening, but not removing, a locking screw and removing at least one blade screw that is threadably engaged with the cutting blade.

* * * * *